United States Patent
Brushaber

[11] Patent Number: 5,988,694
[45] Date of Patent: Nov. 23, 1999

[54] PIPE COUPLING CLAMP WITH LOCKING LEVER

[76] Inventor: Donald Brushaber, 221 Hayes Ct., Normandy Beach, N.J. 08739

[21] Appl. No.: 09/191,695

[22] Filed: Nov. 13, 1998

[51] Int. Cl.⁶ .................................................. F16L 17/025
[52] U.S. Cl. ........................... 285/81; 285/365; 285/409; 285/87
[58] Field of Search ...................... 285/409, 365; 292/250, 210, 256.69, DIG. 49; 281/81, 87, 88, 420

[56] References Cited

U.S. PATENT DOCUMENTS

| | | |
|---|---|---|
| 918,264 | 4/1909 | Bender ..................... 292/250 |
| 995,429 | 6/1911 | Carter ...................... 292/250 |
| 1,636,638 | 7/1927 | Jenkins . |
| 2,236,302 | 3/1941 | Scott . |
| 2,241,089 | 5/1941 | Hampe et al. . |
| 3,157,932 | 11/1964 | Kyrias . |
| 3,276,089 | 10/1966 | Cheever et al. . |
| 3,705,737 | 12/1972 | Westerlund et al. . |
| 3,768,848 | 10/1973 | Santoni .................. 292/256.69 |
| 3,873,142 | 3/1975 | Reid ..................... 292/DIG. 49 |
| 4,008,937 | 2/1977 | Filippi . |
| 5,366,263 | 11/1994 | Hendrickson . |
| 5,380,052 | 1/1995 | Hendrickson . |
| 5,540,465 | 7/1996 | Sisk . |
| 5,722,666 | 3/1998 | Sisk . |

FOREIGN PATENT DOCUMENTS

| | | | |
|---|---|---|---|
| 740882 | 2/1933 | France ................. | 292/256.69 |
| 657153 | 10/1963 | Italy ..................... | 292/256.69 |
| 92361 | 8/1958 | Norway ................ | 285/409 |
| 319582 | 9/1929 | United Kingdom ... | 285/365 |
| 744046 | 2/1956 | United Kingdom ... | 285/365 |

*Primary Examiner*—Eric K. Nicholson
*Attorney, Agent, or Firm*—Arthur Jacob

[57] ABSTRACT

A coupling unit for connecting together serially adjacent pipe sections with coupling members selectively coupled together by placing a latch in a latching position and selectively uncoupled by moving the latch to an unlatched position is improved by incorporating a locking lever movable into a locking location to juxtapose generally complementary locking surfaces to lock the latch in the latching position and movable into an unlocking location wherein the generally complementary locking surfaces are out of juxtaposition for release of the latch for movement to the unlatched position.

18 Claims, 4 Drawing Sheets

PIPE COUPLING CLAMP WITH LOCKING LEVER

The present invention relates generally to pipe couplings and pertains, more specifically, to pipe couplings employed in the field to join together sections of pipe for conducting concrete from a delivery truck to a work site.

It has become common in the construction trades to deliver concrete to a work site by truck and to conduct the concrete, ready for use, directly to the site of construction utilizing temporary conduits assembled in the field from sections of pipe joined together with pipe couplings and strung from the delivery truck to the construction site. The pipe couplings themselves must be of rugged construction to withstand the rigors of such use, and must be relatively simple to operate as well as reliable in service.

One pipe coupling which has found wide acceptance in the field of concrete delivery is disclosed in U.S. Pat. No. 3,705,737, wherein there is described a pipe coupling having a pair of arcuate coupling members hinged together and secured in place at the intersection of pipe sections with a toggle assembly which is easy to operate in the field and which provides reliable performance. The toggle assembly is operated by a handle which includes a lock for assuring that once the pipe coupling is in place at the coupled ends of pipe sections inadvertent release of the toggle assembly is precluded. The lock is in the form of a locking pin inserted into registered holes to fix the handle in place. It has been found that the pin-and-hole locking arrangement of the existing pipe coupling is difficult to engage and, once engaged, can become even more difficult to disengage due to the build up of concrete, mud and other material encountered at the construction site, as well as the effects of corrosion and other deleterious conditions endemic to the environment.

The present invention provides an improvement in a locking arrangement for a coupling unit of the type described above. As such, the present invention attains several objects and advantages, some of which are summarized as follows: Provides a pipe coupling unit with an improved locking arrangement for increased ease of operation with greater reliability in accomplishing both locking and unlocking in the field; facilitates the temporary assembly of pipe sections in the field for conducting concrete, as well as similar substances, at work sites, without the necessity for special tools or highly skilled labor; provides a locking arrangement having a high degree of locking integrity for assuring effective coupling of pipe sections during use, while allowing ready selective unlocking for selective uncoupling of the pipe sections; enables ease of disassembly and removal of a pipe coupling from temporarily assembled pipe sections despite conditions at a building site which otherwise could hinder such disassembly; combines a highly secure locking arrangement with ease of operation in a pipe coupling subjected to severe operating conditions in the field; adapts a proven pipe coupling construction for greater reliability and increased ease of use at construction sites; provides a pipe coupling of rugged construction capable of exemplary performance over an extended service life.

The above objects and advantages, as well as further objects and advantages, are attained by the present invention which may be described briefly as an improvement in a coupling unit for connecting serially adjacent pipe sections extending in a predetermined axial direction utilizing first and second coupling members hinged together for pivotal movement about a first pivotal axis essentially parallel to the predetermined axial direction between an uncoupled condition and a coupled condition, a latch assembly including a latch movable between a latched position, wherein the coupling members are retained by the latch assembly in the coupled condition, and an unlatched position, wherein the coupling members are released by the latch assembly for movement to the uncoupled condition, the improvement enabling selective locking of the latch in the latched position and selective release of the latch from the latched position for movement to the unlatched position, the improvement comprising: a first locking surface on the latch; a locking lever; a second locking surface on the locking lever, the second locking surface being generally complementary to the first locking surface; a pivot mounting the locking lever in juxtaposition with the latch for pivotal movement between a locking location, wherein the second locking surface is juxtaposed with the first locking surface to lock the latch in the latched position, and an unlocking location, wherein the second locking surface is disengaged from the first locking surface to release the latch for selective movement from the latched position to the unlatched position; and a detent for retaining the second locking surface juxtaposed with the first locking surface.

The invention will be understood more fully, while still further objects and advantages will become apparent, in the following detailed description of a preferred embodiment of the invention illustrated in the accompanying drawing, in which.

Figure 1:
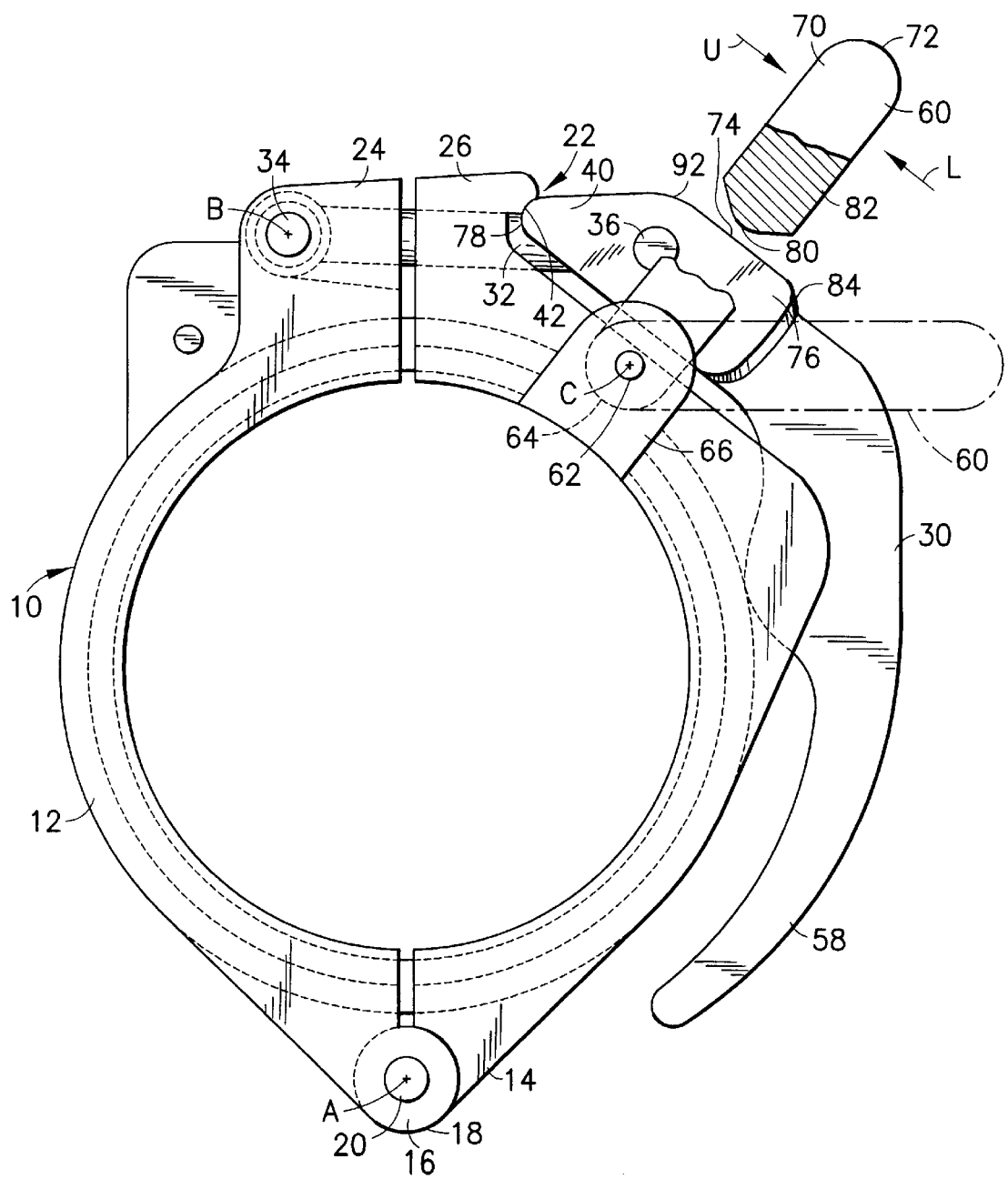
FIG. 1 is a front elevational view of a coupling unit constructed in accordance with the present invention.
Figure 2:
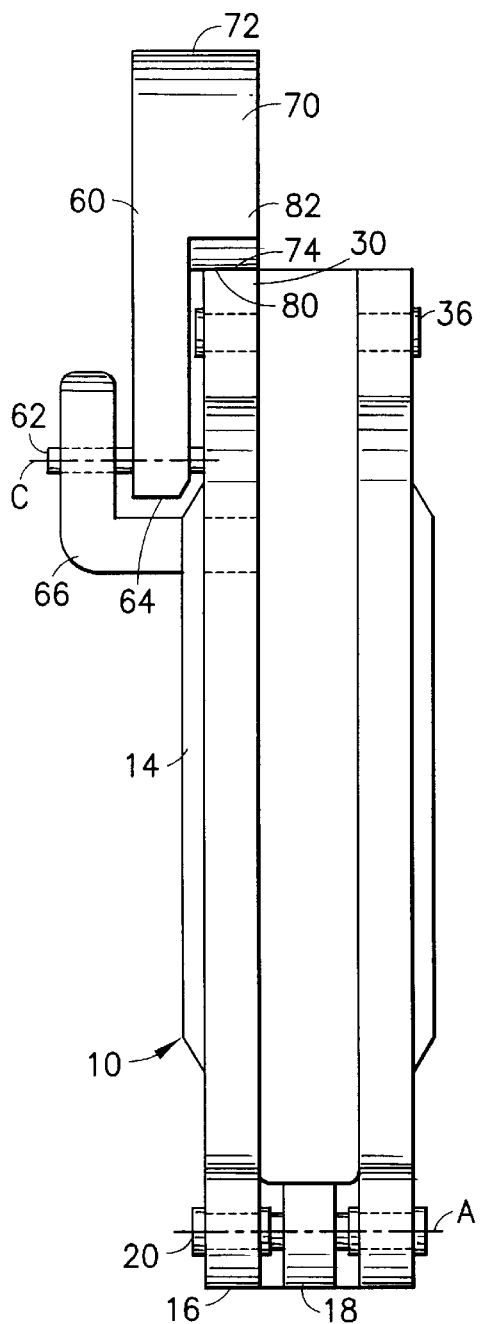
FIG. 2 is a side elevational view of the coupling unit.
Figure 3:
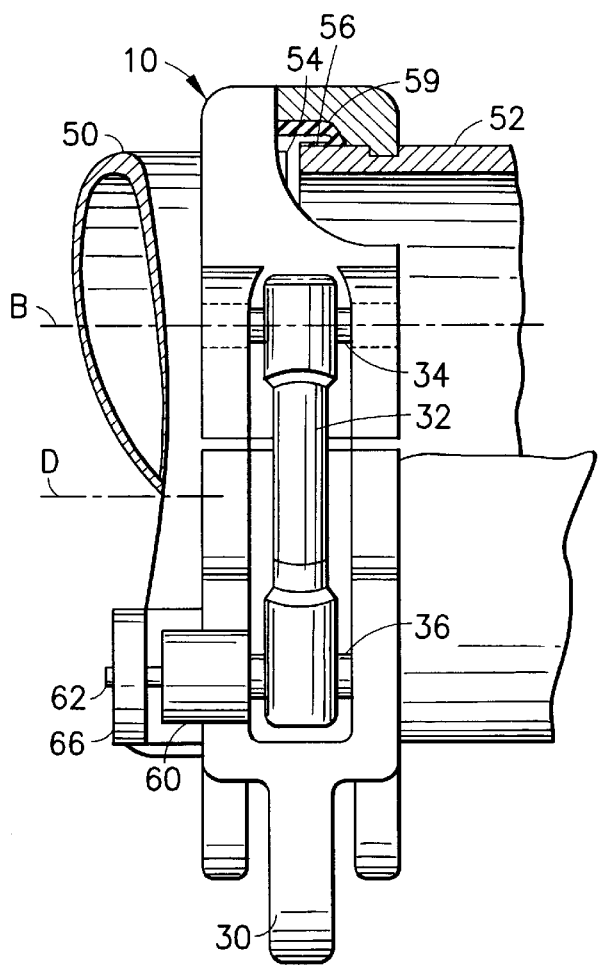
FIG. 3 is a reduced top plan view of the coupling unit in place at the intersection of serially adjacent pipe sections.

Referring now to the drawing, and especially to FIGS. 1 and 2 thereof, a pipe coupling unit constructed in accordance with the present invention is illustrated generally at 10 and is seen to include a generally arcuate first coupling member 12 and a generally arcuate second coupling member 14 hinged together at corresponding ends 16 and 18 by a hinge pin 20 for pivotal movement about a pivotal axis A essentially parallel to a predetermined axial direction D (see FIG. 3). A latching assembly 22 at the opposite ends 24 and 26 of the coupling members 12 and 14 is operated for selective latching together and selective unlatching of the opposite ends 24 and 26 to operate the coupling unit 10, in the manner described fully in the aforesaid U.S. Pat. No. 3,705,737. Thus, latching assembly 22 includes a latch 30 mounted for pivotal movement on the first coupling member 12, by means of a toggle link 32 pivoted adjacent the second end 24 of the first coupling member 12 by a first pivot pin 34, for pivotal movement about a pivotal axis B (see FIG. 3) essentially parallel to axis A, and a second pivot pin 36 connecting the latch 30 to the toggle link 32. Cam arms 40 at one end of the latch 30 engage counterpart cam surfaces 42 adjacent the end 26 of the second coupling member 14 to retain the coupling members 12 and 14 in a closed or coupled condition.

Figure 4:
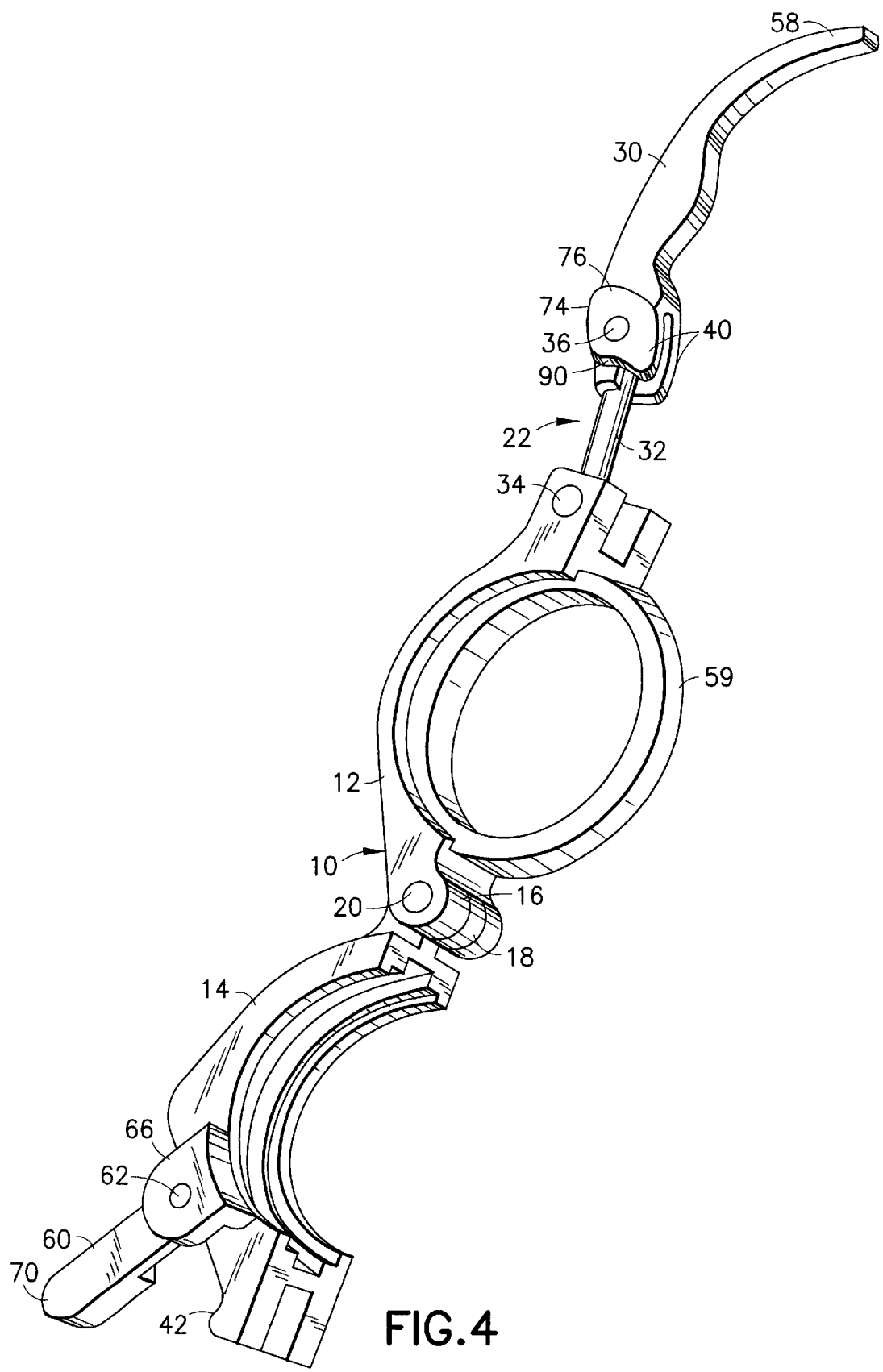
FIG. 4 is a perspective view of the coupling unit in an open configuration.

As seen in FIG. 3, coupling unit 10 is employed to connect together serially adjacent pipe sections 50 and 52 which extend along the predetermined axial direction D. In an open or uncoupled condition, as illustrated in FIG. 4, the latching assembly 22 is disengaged so that the coupling unit 10 is in condition for receiving the end portions 54 and 56 of the pipe sections 50 and 52. By engaging the latching assembly 22, the coupling unit 10 is placed in the coupled condition to connect and secure together the pipe sections 50 and 52, as shown in FIG. 3. Engagement and disengagement of the latching assembly 22 is accomplished by operation of the latch 30, between the latched position illustrated in FIGS. 1, 2 and 3 and the unlatched position illustrated in FIG. 4, through manipulation of a handle 58 adjacent the other end of the latch 30, opposite the the one end carrying the cam arms 40. A generally circular seal 59 seals the connection between the pipe sections 50 and 52.

In order to secure the coupling unit 10 in the coupled condition, and preclude inadvertent release of the coupled pipe sections 50 and 52, the latch 30 is locked in the latched position by a positive locking arrangement. In the earlier arrangement disclosed in U.S. Pat. No. 3,705,737, locking of the manually operated handle is accomplished with a pin-and-hole locking arrangement. The pin-and-hole locking arrangement has been found to be susceptible to jamming as a result of conditions and the build up of unwanted materials encountered at building sites, engendering difficulties in releasing a coupling unit when it is desired to uncouple the pipe sections. Moreover, engagement of the locking arrangement requires more-or-less precise registration of the holes for insertion of the locking pin, which registration and insertion becomes difficult to accomplish in the field. The present invention provides an improved locking arrangement in that both locking and unlocking are attained with increased ease, while locking integrity is reliably maintained during use.

Thus, the present invention includes a locking lever 60 mounted upon the second coupling member 14 by a pivot pin 62 extending in an axial direction, generally parallel to the predetermined axial direction D of the pipe sections 50 and 52, through the locking lever 60 adjacent a first end 64 of the locking lever 60 and supported by the second coupling member 14 and a bracket 66 integral with the second coupling member 14 such that the locking lever 60 is mounted for pivotal movement about a pivotal axis C, located intermediate the ends of the latch 30 and extending essentially parallel to axes A and B. Locking lever 60 extends radially outwardly from the pivot pin 62 and includes an actuator portion 70 adjacent the opposite end 72 of the locking lever 60. The locking lever 60 is pivotally movable about pivot pin 62 between an unlocking location, as illustrated in phantom in FIG. 1, and a locking location, as shown in full lines in FIG. 1. When the coupling unit 10 is in the coupled condition and latch 30 is in the latched position, as seen in FIGS. 1 through 3, locking lever 60 is juxtaposed with the latch 30. Latch 30 includes a first locking surface in the form of a first projecting surface 74 extending axially and circumferentially along a projection 76 integral with and projecting axially from the latch 30 adjacent end 78 of the latch 30. A second locking surface in the form of a second projecting surface 80 is located on the locking lever 60, intermediate the opposite ends of the locking lever 60, and extends axially and circumferentially along a projection 82 integral with and projecting axially from the locking lever 60, in an axial direction opposite to the axial direction in which the projection 76 projects from the latch 30, with the projection 82 located radially outwardly of the projection 76 so that when the locking lever 60 is in the locking location the second projecting surface 80 will overlap the first projecting surface 74. The first and second projecting surfaces 74 and 80 are generally complementary and are juxtaposed to secure the latch 30 in the latched position. A detent retains the second projecting surface 80 in juxtaposition with the first projecting surface 74 and includes a first detent element 84 placed on the latch 30 circumferentially between the handle 58 and the first projecting surface 74 so as to be located between the locking location and the unlocking location of the locking lever 60 for confining the second projecting surface 80 to juxtaposition with the first projecting surface 74. Accordingly, with the latch 30 placed in the latched position, the locking lever 60 is moved in a circumferential direction L over the first detent element 84 and into the locking location, by manipulation of the actuator portion 70, and the latch 30 is secured in the latched position to maintain the coupling unit 10 in the coupled condition.

When it is desired to uncouple the pipe sections 50 and 52, the locking lever 60 selectively is moved in a circumferential direction U, opposite to circumferential direction L, over the first detent element 84, to the unlocking location. The circumferential extent of the first and second projecting surfaces 74 and 80 is limited so that upon movement of the locking lever 60 to the unlocking location, the second projecting surface 80 no longer overlaps the first projecting surface 74, and the latch 30 is released for movement to the unlatched position. The radially outwardly projecting actuator portion 70 provides a readily accessible purchase for manipulating the locking lever 60 between the locked location and the unlocked location. Thus, even with the potential jamming effects arising out of a build up of concrete, mud and other materials encountered at a building site, the actuator portion 70 is available for grasping or even for striking with a sledge hammer or other available tool to overcome any such jamming. Further, the radially projecting actuator portion 70 facilitates movement of the locking lever 60 over the first detent element 84 and into the locking location, enabling the grasping or striking of the actuator portion to overcome any resistance resulting from the effects of corrosion, material build up and other deleterious conditions encountered in the field.

Figure 5:
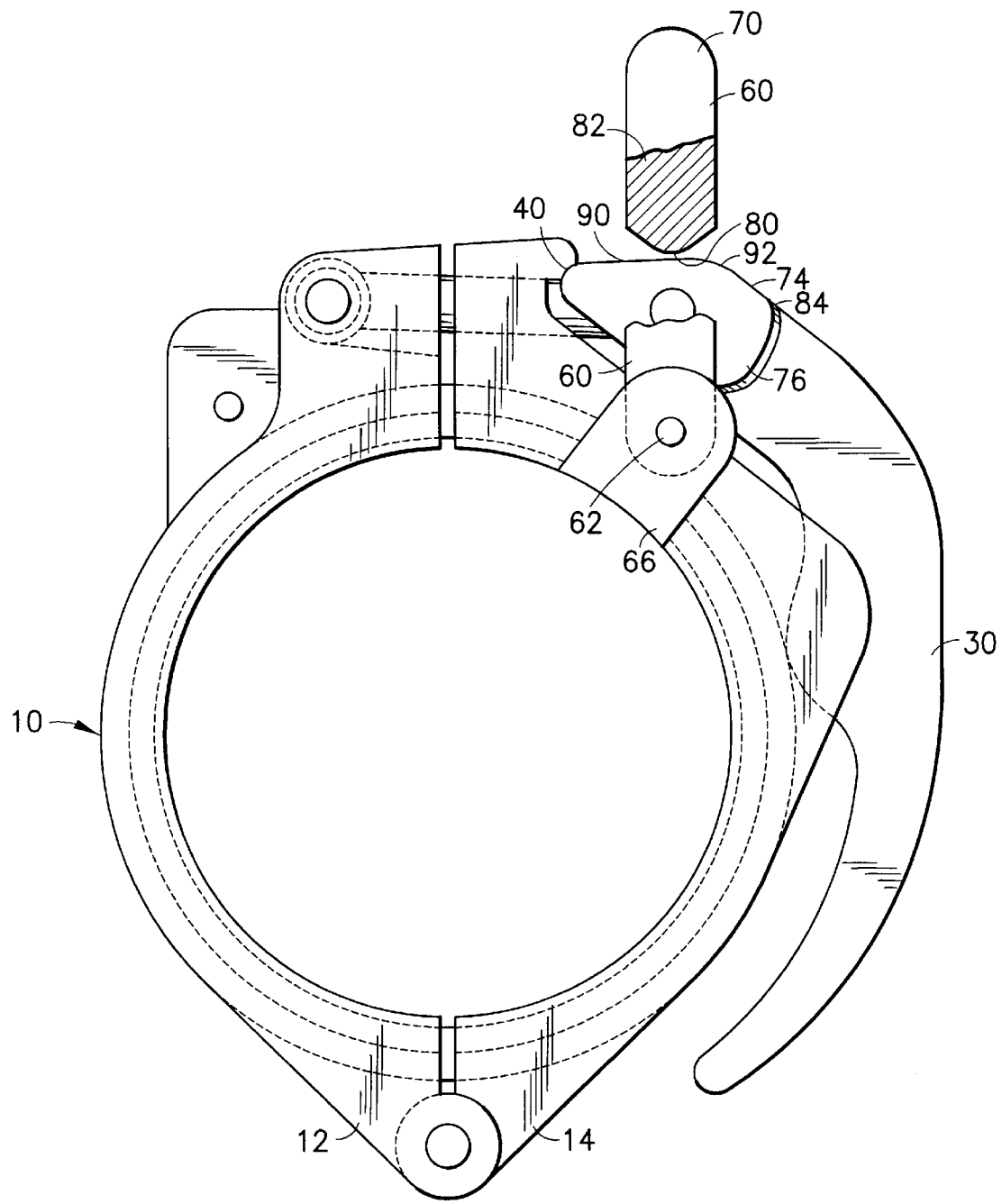
FIG. 5 is a front elevational view similar to FIG. 1 and showing the component parts in another operating position.

Referring now to FIG. 5, as a safety measure, a further locking surface is provided in the form of a further projecting surface 90 extending axially and circumferentially along the projection 76 projecting axially from the latch 30 adjacent the end 78 of the latch 30. Should the locking lever 60 inadvertently be moved circumferentially beyond the locking location illustrated in FIGS. 1 through 3, as by a force on the actuator portion 70 sufficient to move the locking lever 60 beyond that locking location, the location of the further projecting surface 90 spaced circumferentially from the first projecting surface 74, circumferentially beyond the first projecting surface 74, provides a further locking location for the locking lever 60, as illustrated in FIG. 5, wherein the second projecting surface 80 overlaps the further projecting surface 90 to assure that the latch 30 is locked against inadvertent movement away from the latched position. A second detent element 92 is placed on the latch 30 circumferentially between the first locking surface 74 and the further locking surface 90 so as to be located between the locking location and the further locking location of the locking lever 60 for confining the second projecting surface 80 to juxtaposition with the further projecting surface 90. As before, latch 30 is released for movement to the unlatched position by manipulation of the actuator portion 70 of the locking lever 60 to move the locking lever 60 to the unlocking location illustrated in phantom in FIG. 1.

It will be seen that the present invention attains the several objects and advantages summarized above, namely: Provides a pipe coupling unit with an improved locking arrangement for increased ease of operation with greater reliability in accomplishing both locking and unlocking in the field; facilitates the temporary assembly of pipe sections in the field for conducting concrete, as well as similar substances, at work sites, without the necessity for special tools or highly skilled labor; provides a locking arrangement having a high degree of locking integrity for assuring effective coupling of pipe sections during use, while allowing ready selective unlocking for selective uncoupling of the pipe sections; enables ease of disassembly and removal of a pipe coupling from temporarily assembled pipe sections despite conditions at a building site which otherwise could hinder such disassembly; combines a highly secure locking arrangement with ease of operation in a pipe coupling subjected to severe operating conditions in the field; adapts a proven pipe coupling construction for greater reliability and increased ease of use at construction sites; provides a pipe coupling of rugged construction capable of exemplary performance over an extended service life.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. An improvement in a coupling unit for connecting serially adjacent pipe sections extending in a predetermined axial direction utilizing first and second coupling members hinged together for pivotal movement about a first pivotal axis essentially parallel to the predetermined axial direction between an uncoupled condition and a coupled condition, a latch assembly including a latch having opposite ends and being movable between a latched position, wherein the coupling members are retained by the latch assembly in the coupled condition, and an unlatched position, wherein the coupling members are released by the latch assembly for movement to the uncoupled condition, the improvement enabling selective locking of the latch in the latched position and selective release of the latch from the latched position for movement to the unlatched position, the improvement comprising:

a first locking surface on the latch;

a locking lever;

a second locking surface on the locking lever, the second locking surface being generally complementary to the first locking surface;

a pivot mounting the locking lever upon one of the first and second clamping members in juxtaposition with the latch intermediate the ends of the latch for pivotal movement between a locking location, wherein the second locking surface is juxtaposed with the first locking surface to lock the latch in the latched position, and an unlocking location, wherein the second locking surface is disengaged from the first locking surface to release the latch for selective movement from the latched position to the unlatched position; and a detent for retaining the second locking surface juxtaposed with the first locking surface.

2. The improvement of claim 1 wherein the latch is mounted upon the first coupling member for pivotal movement between the latched position and the unlatched position about a second pivotal axis essentially parallel to the first pivotal axis, and the locking lever is mounted upon the second coupling member for pivotal movement between the locking location and the unlocking location about a third pivotal axis essentially parallel to the second pivotal axis.

3. An improvement in a coupling unit for connecting serially adjacent pipe sections extending in a predetermined axial direction utilizing first and second coupling members hinged together for pivotal movement about a first pivotal axis essentially parallel to the predetermined axial direction between an uncoupled condition and a coupled condition, a latch assembly including a latch mounted upon the first coupling member for pivotal movement about a second pivotal axis essentially parallel to the first pivotal axis, between a latched position, wherein the coupling members are retained by the latch assembly in the coupled condition, and an unlatched position, wherein the coupling members are released by the latch assembly for movement to the uncoupled condition, the improvement enabling selective locking of the latch in the latched position and selective release of the latch from the latched position for movement to the unlatched position, the improvement comprising:

a first locking surface on the latch;

a locking lever;

a second locking surface on the locking lever, the second locking surface being generally complementary to the first locking surface;

a pivot mounting the locking lever upon the second coupling member in juxtaposition with the latch for pivotal movement about a third pivotal axis essentially parallel to the second pivotal axis between a locking location, wherein the second locking surface is juxtaposed with the first locking surface to lock the latch in the latched position, and an unlocking location, wherein the second locking surface is disengaged from the first locking surface to release the latch for selective movement from the latched position to the unlatched position; and a detent for retaining the second locking surface juxtaposed with the first locking surface;

the first locking surface including a first projecting surface on the latch, the first projecting surface projecting from the latch in a first axial direction; and the second locking surface including a second projecting surface on the locking lever, the second projecting surface projecting from the locking lever in a second axial direction opposite to the first axial direction so as to overlap the first projecting surface when the locking lever is in the locking location;

the first and second projecting surfaces each having a limited circumferential extent such that pivotal movement of the locking lever relative to the latch in one circumferential direction moves the second projecting surface into juxtaposition with the first projecting surface, when the locking lever is in the locking location, and pivotal movement of the locking lever relative to the latch in another circumferential direction opposite to the one circumferential direction moves the second projecting surface out of juxtaposition with the first projecting surface, when the locking lever is in the unlocking location, for releasing the latch for movement from the latched position to the unlatched position.

4. The improvement of claim 1 wherein the locking lever extends radially from the pivot and includes an end remote from the pivot, an actuator portion is located on the locking lever adjacent the remote end, and the second locking surface is located radially intermediate the pivot and the remote end.

5. The improvement of claim 4 wherein the latch is mounted upon the first coupling member for pivotal movement between the latched position and the unlatched position about a second pivotal axis essentially parallel to the first pivotal axis, and the locking lever is mounted upon the second coupling member for pivotal movement between the locking location and the unlocking location about a third pivotal axis essentially parallel to the second pivotal axis.

6. An improvement in a coupling unit for connecting serially adjacent pipe sections extending in a predetermined axial direction utilizing first and second coupling members hinged together for pivotal movement about a first pivotal axis essentially parallel to the predetermined axial direction between an uncoupled condition and a coupled condition, a latch assembly including a latch mounted upon the first coupling member for pivotal movement about a second pivotal axis essentially parallel to the first pivotal axis between a latched position, wherein the coupling members are retained by the latch assembly in the coupled condition, and an unlatched position, wherein the coupling members are released by the latch assembly for movement to the uncoupled condition, the improvement enabling selective locking of the latch in the latched position and selective release of the latch from the latched position for movement to the unlatched position, the improvement comprising:

a first locking surface on the latch;

a locking lever;

a second locking surface on the locking lever, the second locking surface being generally complementary to the first locking surface;

a pivot mounting the locking lever upon the second coupling member in juxtaposition with the latch for pivotal movement about a third pivotal axis essentially parallel to the second pivotal axis between a locking location, wherein the second locking surface is juxtaposed with the first locking surface to lock the latch in the latched position, and an unlocking location, wherein the second locking surface is disengaged from the first locking surface to release the latch for selective movement from the latched position to the unlatched position;

the locking lever extending radially from the pivot and including an end remote from the pivot, an actuator portion located on the locking lever adjacent the remote end, the second locking surface being located radially intermediate the pivot and the remote end; and a detent for retaining the second locking surface juxtaposed with the first locking surface;

the first locking surface including a first projecting surface on the latch, the first projecting surface projecting from the latch in a first axial direction; and the second locking surface including a second projecting surface on the locking lever, the second projecting surface projecting from the locking lever in a second axial direction opposite to the first axial direction so as to overlap the first projecting surface when the locking lever is in the locking location;

the first and second projecting surfaces each having a limited circumferential extent such that pivotal movement of the locking lever relative to the latch in one circumferential direction moves the second projecting surface into juxtaposition with the first projecting surface, when the locking lever is in the locking location, and pivotal movement of the locking lever relative to the latch in another circumferential direction opposite to the one circumferential direction moves the second projecting surface out of juxtaposition with the first projecting surface, when the locking lever is in the unlocking location, for releasing the latch for movement from the latched position to the unlatched position.

7. The improvement of claim 1 wherein the detent includes a first detent element on the latch placed circumferentially between the locking location and unlocking location of the locking lever.

8. The improvement of claim 1 wherein the locking lever is selectively movable into a further locking location and a further locking surface is placed on the latch, the further locking surface being generally complementary to the second locking surface and spaced circumferentially from the first locking surface for selective juxtaposition by the second locking surface when the locking lever is moved to the further locking location.

9. An improvement in a coupling unit for connecting serially adjacent pipe sections extending in a predetermined axial direction utilizing first and second coupling members hinged together for pivotal movement about a first pivotal axis essentially parallel to the predetermined axial direction between an uncoupled condition and a coupled condition, a latch assembly including a latch movable between a latched position, wherein the coupling members are retained by the latch assembly in the coupled condition, and an unlatched position, wherein the coupling members are released by the latch assembly for movement to the uncoupled condition, the improvement enabling selective locking of the latch in the latched position and selective release of the latch from the latched position for movement to the unlatched position, the improvement comprising:

a first locking surface on the latch;

a locking lever;

a second locking surface on the locking lever, the second locking surface being generally complementary to the first locking surface;

a pivot mounting the locking lever in juxtaposition with the latch for pivotal movement between a locking location, wherein the second locking surface is juxtaposed with the first locking surface to lock the latch in the latched position, and an unlocking location, wherein the second locking surface is disengaged from the first locking surface to release the latch for selective movement from the latched position to the unlatched position; and a detent for retaining the second locking surface juxtaposed with the first locking surface;

the locking lever being selectively movable into a further locking location; and a further locking surface placed on the latch, the further locking surface being generally complementary to the second locking surface and spaced circumferentially from the first locking surface for selective juxtaposition by the second locking surface when the locking lever is moved to the further locking location;

the detent including a first detent element on the latch placed circumferentially between the locking location and unlocking location of the locking lever, and a second detent element placed circumferentially between the locking location and the further locking location of the locking lever.

10. An improvement in a coupling unit for connecting serially adjacent pipe sections extending in a predetermined axial direction utilizing first and second coupling members hinged together for pivotal movement about a first pivotal axis essentially parallel to the predetermined axial direction between an uncoupled condition and a coupled condition, a latch assembly including a latch movable between a latched position, wherein the coupling members are retained by the latch assembly in the coupled condition, and an unlatched position, wherein the coupling members are released by the latch assembly for movement to the uncoupled condition, the improvement enabling selective locking of the latch in the latched position and selective release of the latch from the latched position for movement to the unlatched position, the improvement comprising:

a first locking surface on the latch;

a locking lever;

a second locking surface on the locking lever, the second locking surface being generally complementary to the first locking surface;

a pivot mounting the locking lever in juxtaposition with the latch for pivotal movement between a locking location, wherein the second locking surface is juxtaposed with the first locking surface to lock the latch in the latched position, and an unlocking location, wherein the second locking surface is disengaged from the first locking surface to release the latch for selective movement from the latched position to the unlatched position; and a detent for retaining the second locking surface juxtaposed with the first locking surface;

the locking lever being selectively movable into a further locking location; and a further locking surface placed on the latch, the further locking surface being generally complementary to the second locking surface and spaced circumferentially from the first locking surface for selective juxtaposition by the second locking surface when the locking lever is moved to the further locking location;

the latch being mounted upon the first coupling member for pivotal movement between the latched position and the unlatched position about a second pivotal axis essentially parallel to the first pivotal axis, and the locking lever being mounted upon the second coupling member for pivotal movement between the locking location, the unlocking location and the further unlocking location about a third pivotal axis essentially parallel to the second pivotal axis.

11. The improvement of claim 10 wherein:

the first locking surface includes a first projecting surface on the latch, the first projecting surface projecting from the latch in a first axial direction;

the further locking surface includes a further projecting surface on the latch, the further projecting surface projecting from the latch in the first axial direction; and the second detent element includes a second projecting surface on the locking lever, the second projecting surface projecting from the locking lever in a second axial direction opposite to the first axial direction so as to overlap the first projecting surface when the locking lever is in the locking location and to overlap the further projecting surface when the locking lever in the further locking location;

the first, second and further projecting surfaces each having a limited circumferential extent such that pivotal movement of the locking lever relative to the latch in one circumferential direction moves the second projecting surface into juxtaposition with the first projecting surface, when the locking lever is in the locking location, further pivotal movement of the locking lever in the one circumferential direction moves the second projecting surface into juxtaposition with the further projecting surface, when the locking lever is in the further locking location, and pivotal movement of the locking lever relative to the latch in another circumferential direction opposite to the one circumferential direction moves the second projecting surface out of juxtaposition with the further projecting surface and out of juxtaposition with the first projecting surface, when the locking lever is in the unlocking location, for releasing the latch for movement from the latched position to the unlatched position.

12. The improvement of claim 11 wherein the locking lever extends radially from the pivot and includes an end remote from the pivot, an actuator portion is located on the locking lever adjacent the remote end, and the second locking surface is located radially intermediate the pivot and the remote end.

13. The improvement of claim 2 wherein:

the first locking surface includes a first projecting surface on the latch, the first projecting surface projecting from the latch in a first axial direction; and the second locking surface includes a second projecting surface on the locking lever, the second projecting surface projecting from the locking lever in a second axial direction opposite to the first axial direction so as to overlap the first projecting surface when the locking lever is in the locking location;

the first and second projecting surfaces each having a limited circumferential extent such that pivotal movement of the locking lever relative to the latch in one circumferential direction moves the second projecting surface into juxtaposition with the first projecting surface, when the locking lever is in the locking location, and pivotal movement of the locking lever relative to the latch in another circumferential direction opposite to the one circumferential direction moves the second projecting surface out of juxtaposition with the first projecting surface, when the locking lever is in the unlocking location, for releasing the latch for movement from the latched position to the unlatched position.

14. The improvement of claim 5 wherein:

the first locking surface includes a first projecting surface on the latch, the first projecting surface projecting from the latch in a first axial direction; and the second locking surface includes a second projecting surface on the locking lever, the second projecting surface projecting from the locking lever in a second axial direction opposite to the first axial direction so as to overlap the first projecting surface when the locking lever is in the locking location;

the first and second projecting surfaces each having a limited circumferential extent such that pivotal movement of the locking lever relative to the latch in one circumferential direction moves the second projecting surface into juxtaposition with the first projecting surface, when the locking lever is in the locking location, and pivotal movement of the locking lever relative to the latch in another circumferential direction opposite to the one circumferential direction moves the second projecting surface out of juxtaposition with the first projecting surface, when the locking lever is in the unlocking location, for releasing the latch for movement from the latched position to the unlatched position.

15. The improvement of claim 8 wherein the detent includes a first detent element on the latch placed circumferentially between the locking location and unlocking location of the locking lever, and a second detent element placed circumferentially between the locking location and the further locking location of the locking lever.

16. The improvement of claim 8 wherein the latch is mounted upon the first coupling member for pivotal movement between the latched position and the unlatched position about a second pivotal axis essentially parallel to the first pivotal axis, and the locking lever is mounted upon the second coupling member for pivotal movement between the locking location, the unlocking location and the further unlocking location about a third pivotal axis essentially parallel to the second pivotal axis.

17. The improvement of claim 16 wherein:

the first locking surface includes a first projecting surface on the latch, the first projecting surface projecting from the latch in a first axial direction;

the further locking surface includes a further projecting surface on the latch, the further projecting surface projecting from the latch in the first axial direction; and the second detent element includes a second projecting surface on the locking lever, the second projecting surface projecting from the locking lever in a second axial direction opposite to the first axial direction so as to overlap the first projecting surface when the locking lever is in the locking location and to overlap the further projecting surface when the locking lever in the further locking location;

the first, second and further projecting surfaces each having a limited circumferential extent such that pivotal movement of the locking lever relative to the latch in one circumferential direction moves the second projecting surface into juxtaposition with the first projecting surface, when the locking lever is in the locking location, further pivotal movement of the locking lever in the one circumferential direction moves the second projecting surface into juxtaposition with the further projecting surface, when the locking lever is in the further locking location, and pivotal movement of the locking lever relative to the latch in another circumferential direction opposite to the one circumferential direction moves the second projecting surface out of juxtaposition with the further projecting surface and out of juxtaposition with the first projecting surface, when the locking lever is in the unlocking location, for releasing the latch for movement from the latched position to the unlatched position.

18. The improvement of claim 17 wherein the locking lever extends radially from the pivot and includes an end remote from the pivot, an actuator portion is located on the locking lever adjacent the remote end, and the second locking surface is located radially intermediate the pivot and the remote end.

* * * * *